Oct. 9, 1923.  
J. R. GRAY  
PIPE TONGS  
Original Filed Dec. 12, 1921  
1,470,161
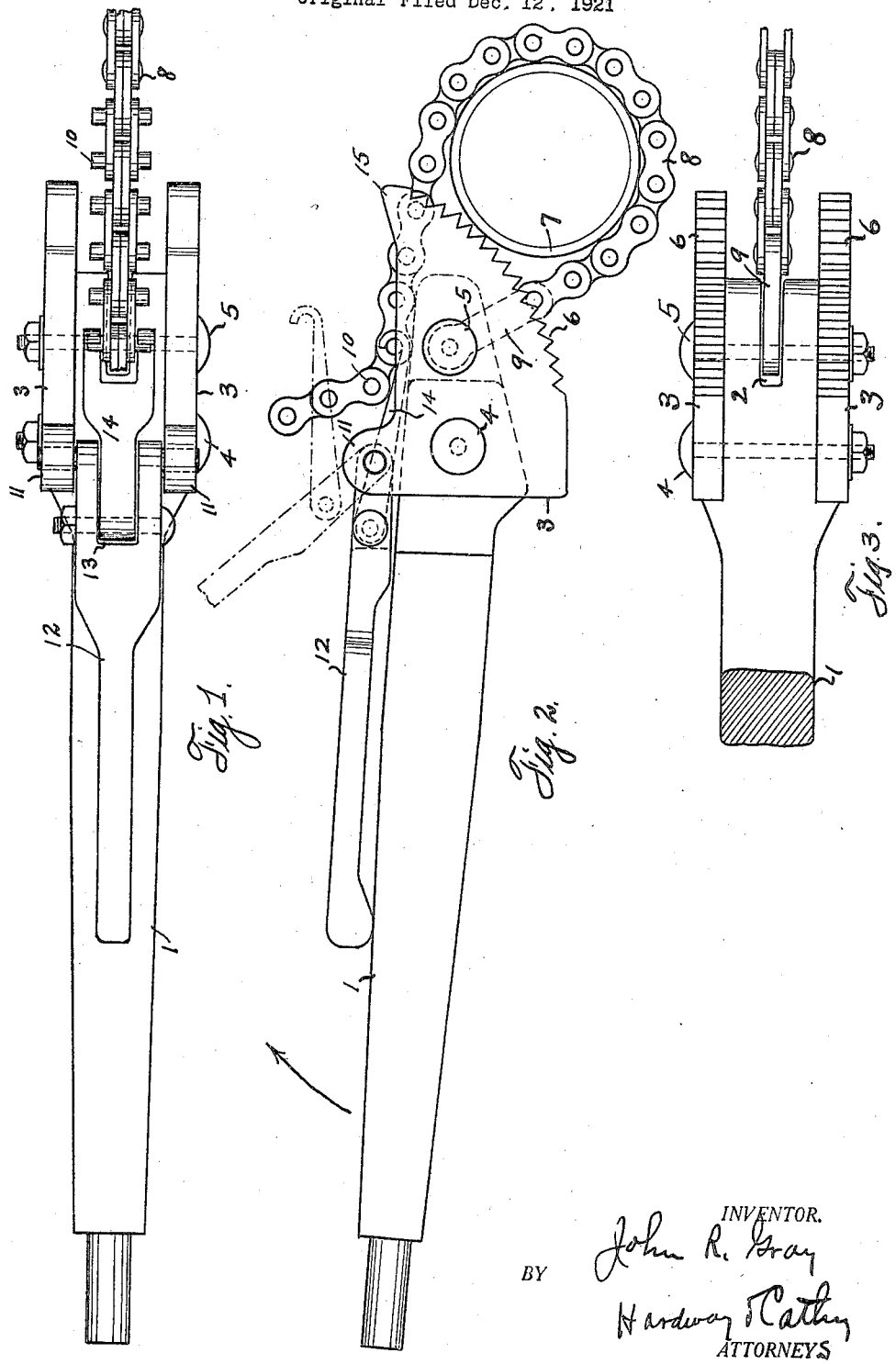

Patented Oct. 9, 1923.

1,470,161

UNITED STATES PATENT OFFICE.

JOHN R. GRAY, OF GOOSE CREEK, TEXAS, ASSIGNOR OF ONE-HALF TO ED. LEACH, OF BEXAR COUNTY, TEXAS.

PIPE TONGS.

Application filed December 12, 1921, Serial No. 521,628. Renewed June 4, 1923.

*To all whom it may concern:*

Be it known that I, JOHN R. GRAY, citizen of the United States, residing at Goose Creek, in the county of Harris and State of Texas, have invented certain new and useful Improvements in Pipe Tongs, of which the following is a specification.

This invention relates to new and useful improvements in a pipe tong.

One object of the invention is to provide a tong of the character described specially adapted for use in handling pipe and other round objects.

Another object of the invention is to provide a tong which may be quickly and easily applied to the work and readily released therefrom.

With the above and other objects in view the invention has particular relation to certain novel features of construction, operation and arrangement of parts an example of which is given in this specification and illustrated in the accompanying drawings, wherein:—

Figure 1 is a plan view of the tong.

Figure 2 is a side view applied to the work and

Figure 3 is a fragmentary end view.

In the drawings, the numeral 1 designates the handle whose operative end has the deep slot 2. Fastened to the operative end of the handle, one on each side are the jaws 3, 3. These jaws are fastened to the handle by means of the bolts 4 and 5, the latter of which passes through the slot 2. The operative ends of the jaws are arcuate and serrated forming the teeth 6 which engage with the pipe 7 when in use. A chain 8 is provided having the long end link 9 which is pivoted on the bolt 5 and works in the slot 2. The links at the free end of this chain are connected by pins 10 which project out each way, as shown in Figure 1.

The jaws 3 are formed with upstanding ears 11 between which the free end of the lever 12 is pivoted. The pivoted end of this lever has a deep slot 13 in which one end of the bifurcated hook 14 is pivoted.

In operation the chain 8 is drawn around the pipe 7 to be turned, the teeth engaging against said pipe. The lever 12 is then swung out from the handle 1 into position indicated by dotted lines in Figure 2 and the hook 14 is engaged over the opposite ends of the adjacent pin 10. The lever 12 is then forced back against the handle 1, as shown in full lines in Figure 2 and the hook 14 will draw the chain tightly around the pipe, said chain resting between the upturned free ends of the jaws 3. The tong is then manipulated in the direction indicated by the arrow in Figure 2 and the joint of pipe will be turned with it. The tong may be readily released from the pipe by throwing out the lever 12 thus releasing the tension of the chain and permitting the disengagement of the hooks 14.

What I claim is:

1. A tong including handle, pipe engaging jaws fastened to the operative end thereof, a chain pivoted at one end between said jaws and whose other end carries laterally projecting pins, a lever pivoted at one end to said tong and a bifurcated hook pivoted at one end of said lever and whose other end is formed to engage with the opposite ends of one of said pins.

2. A tong including a handle, one end of which is slotted, pipe engaging jaws secured to said end of said handle, a chain having an end link pivoted in said slot, pins connecting the links at the free end of said chain and projecting each way therefrom, a lever pivoted at one end of said tong, a hook pivoted at one end of said lever and whose other end is bifurcated and adapted to engage over the projecting ends of said pins.

In testimony whereof I have signed my name to this specification in the presence of two subscribing witnesses.

JOHN R. GRAY.

Witnesses:
WM. A. CATHEY,
SIDNEY F. MITCHELL.